Feb. 26, 1952

O. L. R. SCHRAM ET AL 2,586,867

GOVERNOR

Filed March 16, 1946

Inventors
ORLAND L. R. SCHRAM
FREDERICK E. SMITH

By J. L. Walker
Attorney

Patented Feb. 26, 1952

2,586,867

UNITED STATES PATENT OFFICE 2,586,867

GOVERNOR

Orland L. R. Schram and Frederick E. Smith, Dayton, Ohio, assignors to The Master Electric Company, Dayton, Ohio, a corporation of Ohio Application March 16, 1946, Serial No. 654,919

11 Claims. (Cl. 201—51)

This invention pertains to automatic regulation of voltage or frequency characteristics of an electric current, proportionately to fluctuations of speed of rotation of an associated member; and relates more particularly to the form, structure and mode of operation of a centrifugally operated pressure unit automatically imposing varying degrees of pressure upon a carbon pile included in the electrical circuit.

The regulated electrical circuit containing a carbon pile may be the energizing circuit of an electrical motor or the field circuit of a generator upon which the centrifugal governor is mounted for unison rotation, the fluctuations of the speed of rotation of which determines the varying degrees of pressure upon the carbon pile. The centrifugally actuated pressure unit may be responsive to any driving means therefor either controlled by or apart from the particular electrical circuit being regulated.

It is recognized that neither the utilization of a carbon pile in an electrical circuit nor the control of pressure thereon by centrifugally influenced means, is broadly new or novel and does not, per se, comprise an inventive part of the instant disclosure.

The object of the present invention is to simplify the construction, as well as the means and mode of operation of a centrifugally influenced variable pressure unit, to which a regulatory carbon pile in an electrical circuit is responsive which may not only be economically constructed, but will be more efficient in use, automatic in operation, uniform in action, pressure responsive to minute changes of speed of rotation, having few operating parts, and be unlikely to get out of repair.

A further and important object of the invention is to provide a universally applicable centrifugal pressure unit which will exert a predetermined pressure at a given speed of rotation, and which may be calibrated at the time of its manufacture and subsequently interchanged with other like units or adapted to other like conditions without the necessity of further adjustment.

A further object of the invention is to enable application of direct pressure to the carbon pile with development of minimum friction and eccentricity.

A further object of the invention is to provide a centrifugal pressure unit for the instant purpose having the advantageous structural features and the inherent meritorious characteristics and mode of operation herein disclosed.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is shown the preferred, but not necessarily the only form of embodiment of the invention, Fig. 1 is a side elevation, partly in section of a dynamo-electric machine, i. e. an electric motor or generator on which a centrifugal governor embodying the present invention is mounted for unison rotation, relative to a carbon pile upon which variations of pressure proportionate to fluctuations of speed of rotation are imposed.

Like parts are indicated by similar character of reference throughout the several views.

Figure 1:
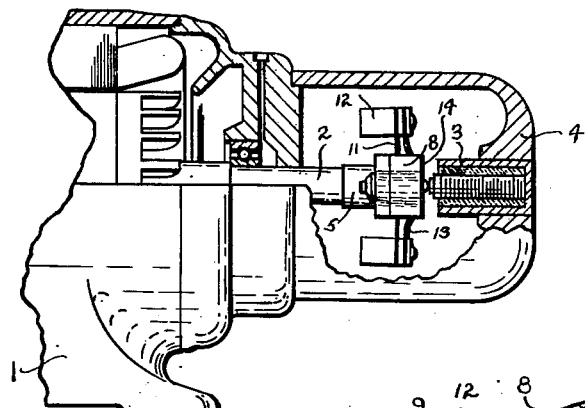
Figure 2:
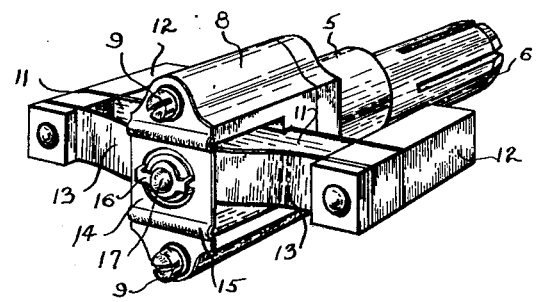
Fig. 2 is a perspective view of an assembled centrifugal pressure unit embodying the present invention.
Figure 3:
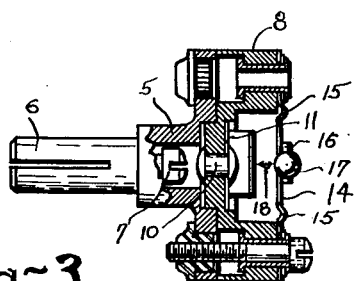
Fig. 3 is a side elevation partly in section thereof.

Referring to the drawings, 1 indicates a power driving unit, on the rotor shaft 2 of which the centrifugal pressure unit forming the subject matter hereof is mounted. The carbon pile 3 with which the pressure unit cooperates is shown for convenience mounted in extension 4 of the housing of the driving member 1.

Obviously the carbon pile may be mounted independently of the power unit. The centrifugal pressure unit includes a rotary head 5 which projects a split stem 6, insertable within an axial bore within the end of the power unit shaft 2. The split stem is expandable therein for unison rotation by means of a slightly tapered screw 7, which is accessible upon detachment from the head 5 of a bifurcated yoke 8, attached to the head by screws 9—9. The rotary head 5 may be attached to the shaft 2 by a hub or collar upon the head 5, and the expanding stem may be omitted.

Medially attached to the yoke 8 by a rivet 10 and extending transversely thereof is a flat tension spring 11 to the opposite ends of which are attached weights 12 responsive to centrifugal influence, against the tension of the spring 11.

Figure 4:
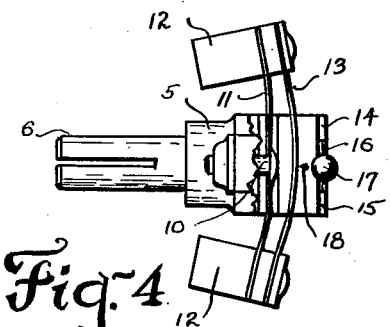
Fig. 4 is a top plan view, partly broken away of the centrifugal pressure unit, while at rest.
Figure 5:
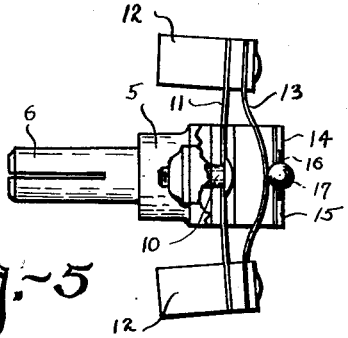
Fig. 5 is a similar view showing the centrifugal pressure unit while in operated condition.

The centers of gravity of the weights 12 are somewhat offset relative to the tension spring 11 toward the left of Figs. 4 and 5, so that the weight will exert a deflecting effort against the tension of the spring 11. Also interconnecting the centrifugally responsive weight 12 independently of the yoke 8 in spaced relation with the connection thereto of the tension spring 11 is a flat spring 13 subject to medial buckling or warping, as in Fig. 5, by the outward movement of the weights 12 under centrifugal influence against the tension of the spring 11.

Connected across the terminals of the furcations of the yoke 8 is a flexible diaphragm 14, having therein crimps or expansion ribs 15. At the center of the diaphragm 14, coincident with the axis of rotation of the unit, is a socket 16 in which a hardened spherical contact member or ball 17 is mounted, the poles of which are exposed beyond the opposite faces of the socket 16. The carbon pile 3 and the centrifugal pressure unit are positioned in such relation that the ball 17 engages the contact point of the carbon pile 3 coincident with the axis of rotation.

As the spring 13 is flexed, or medially buckled by the outward oscillatory motion of the weights 12, which is additional to their rotation, the bow or arch formed thereby varies with the deflection of the weights in their plane of rotation and contacts with greater or less pressure the spherical contact ball 17. The diaphragm 14, on which the contact ball is supported yields to the pressure of the bow spring, and such pressure is transmitted by the ball 17 to the carbon pile. Such contact is substantially frictionless. By so arranging the parts, whereby the distance between the crown of the bow spring 13 and the contact ball 17, at 18 is a constant at a given speed of rotation the centrifugal pressure units may be interchanged without the necessity of making adjustments.

The construction and operation is such that the centers of gravity of the governor weights being offset relative to the spring 11, are subject to a tilting motion relative to their planes of rotation under centrifugal influence additional to their radial tendency in their planes of rotation. The tilting or deflection of the weights 12 in an effort to align their centers of gravity in the planes of rotation affords a leverage action wherein the weights 12 tend to fulcrum on their connections with the spring 11. Such leverage action causes the opposite ends of the weights 12 to approach each other and compress the spring 13 from its opposite ends, thus modifying the curvature of the intermediate bow of said spring 13. The increase or decrease of the bow of the spring in accordance with the speed of rotation exerts more or less pressure axially upon the contact ball 17. The latter being coincident with the axis of rotation of the unit, affords little or no friction, between the spring 13 and ball 17, and between the ball contact 17 and the carbon pile. Concentricity of the ball 17 and the rotating unit is likewise assured by the present construction.

From the above description it will be apparent that there is thus provided a device of the charter described possessing the particular features of advantage before enumerated as desirable, but which obviously is susceptible of modification in its form, proportions, detail construction and arrangement of parts without departing from the principle involved or sacrificing any of its advantages.

While in order to comply with the statue the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. An electrical current regulator for an electrical circuit having therein a source of electrical energy and a carbon pile responsive to fluctuations of pressure by which certain characteristics of the current flowing through said circuit are variable, characterized by a centrifugally influenced pressure unit, including a revoluble bifurcated head, a pair of centrifugally influenced weights, a pair of flat relatively spaced tensioned springs interconnecting the weights, one of the springs being medially connected with the head for unison rotation, the other spring being independent of the head, and subject to flexing adjustment under influence of the centrifugally influenced weights, a flexible diaphragm interconnecting the furcations of the head, a socket carried thereby, and a revoluble ball carried in the socket, coincident with the axis of rotation of the head, the construction and arrangement being such that upon movement of the weights under centrifugal influence, the second of said pair of springs is flexed into contact engagement with the ball and effects thrust pressure of the ball upon the carbon pile.

2. An electrical current regulator for an electrical circuit having therein a source of electrical energy and a carbon pile responsive to fluctuations of pressure by which certain characteristics of the current flowing through said circuit are variable, characterized by a revoluble head, centrifugally influenced weights carried thereby, an antifriction contact member engageable under variable pressure with the carbon pile, and a deflectable thrust member interconnecting said weights and normally spaced from said contact member, said thrust member exerting variable pressures upon the antifriction contact member proportionate to fluctuations of speed of rotation of the head.

3. An electrical current regulator for an electrical circuit having therein a source of electrical energy and a carbon pile responsive to fluctuations of pressure by which certain characteristics of the current flowing through said circuit are variable, characterized by a revoluble head, a pair of centrifugally influenced weights carried thereby, a flexible diaphragm carried thereby, a contact ball carried by the diaphragm coincident with the axis of rotation of the head, and a thrust member exerting fluctuating pressure under centrifugal influence upon the ball against the carbon pile proportionately to fluctuations of the speed of rotation of the head.

4. An electrical current regulator for a circuit having therein a source of electrical energy, certain characteristics of which are variable in accordance with fluctuations of pressure imposed upon a carbon pile included in said circuit, characterized by a pair of revoluble centrifugally influenced weights, actuating means therefor, an adjustable ball contact member engageable with the carbon pile under varying pressures, a bow spring normally disengaged from said contact member and flexed into engagement with the adjustable contact member by the movement of the centrifugally influenced weights in accordance with fluctuations of speed of rotation thereof.

5. An electrical current regulator for a circuit having therein a source of electrical energy, certain characteristics of which are variable in accordance with fluctuations of pressure imposed upon a carbon pile included in said circuit, characterized by an adjustable ball contact member engageable with the carbon pile under varying degrees of pressure, a pair of centrifugally influenced weights, actuating means therefor, a bow spring flexed to varying degree by the movement of the centrifugally influenced weights, the crown of which bow spring is engageable by action of said weights with the adjustable contact member to press the latter upon the carbon pile.

6. An electrical current regulator for a circuit having therein a source of electrical energy, certain characteristics of which are variable in accordance with fluctuations of pressure imposed upon a carbon pile included in said circuit, characterized by a revoluble contact member engageable under varying pressure with the carbon pile, a bow spring, the crown of which is normally spaced from the contact member and is engageable with the contact member with variable pressure incident to different degrees of deflection of the bow spring, and centrifugally influenced means for deflecting the bow spring to varying degree in accordance with the speed of rotation of the centrifugally influenced means.

7. An electrical current regulator for a circuit having therein a source of electrical energy, certain characteristics of which are variable in accordance with fluctuations of pressure imposed upon a carbon pile included in said circuit, characterized by a contact member engageable under varying pressure with the carbon pile, a flexible mounting therefor, a bow spring subject to deflection to different degree, the crown of the bow of which exerts pressure upon the contact member proportionate to the degree of deflection of the spring, and centrifugally influenced means for deflecting the bow spring proportionately to the speed of rotation of the centrifugally influenced means.

8. An electrical current regulator for a circuit having therein a source of electrical energy, certain characteristics of which are variable in accordance with fluctuations of pressure imposed upon a carbon pile included in said circuit, characterized by a revoluble ball contact member engageable with the carbon pile under varying pressure, a yielding support having a socket for housing for the revoluble contact member, centrifugally influenced means for exerting thrust pressure upon the revoluble contact member, the contact member being positioned coincident with the axis of rotation of the centrifugally influenced means but normally out of contact therewith.

9. An electrical current regulator for a circuit having therein a source of electrical energy, certain characteristics of which are variable in accordance with fluctuations of pressure imposed upon a carbon pile included in said circuit, characterized by a revoluble ball contact mounted in a socket, said ball being engageable with the carbon pile, a yielding support therefor, and centrifugally influenced means movable to engage and exert pressure upon the ball contact coincident with the axis of rotation of the centrifugally influenced means.

10. An electrical current regulator for a circuit having therein a source of electrical energy, certain characteristics of which are variable in accordance with fluctuations of pressure imposed upon a carbon pile included in said circuit, characterized by a pair of centrifugally influenced rotary weights, an antifriction contact member disposed on the axis of rotation of the weights and engageable with the carbon pile under varying degrees of pressure and means for transmitting to the antifriction contact member thrust pressures proportionate to fluctuations of speed of rotation of the weights by the resulting influence thereon.

11. An electrical current regulator for a circuit having therein a source of electrical energy, certain characteristics of which are variable in accordance with fluctuations of pressure imposed upon a carbon pile included in said circuit, characterized by a contact member having thrust engagement under varying pressure with the carbon pile, a flexible mounting therefor, a bow spring a medial area of which has thrust engagement with the contact member, and centrifugally influenced means subjecting the bow spring to longitudinal compression by which the spring is bowed to varying degree proportionate to fluctuations of the speed of rotation of the centrifugally influenced means.

ORLAND L. R. SCHRAM.
FREDERICK E. SMITH.

REFERENCES CITED

The following references are of record in the file of this patent:

UNITED STATES PATENTS

| Number | Name | Date |
|---|---|---|
| 1,528,627 | Peters | Mar. 3, 1925 |
| 1,855,333 | Borovec | Apr. 26, 1932 |
| 1,892,054 | Hinchman | Dec. 27, 1932 |
| 1,955,111 | Buckler | Apr. 17, 1934 |
| 2,021,196 | Oldham | Nov. 19, 1935 |
| 2,339,749 | Albers | Jan. 25, 1944 |
| 2,460,246 | Vacha | Jan. 25, 1949 |